US012770464B2

(12) United States Patent
Macke

(10) Patent No.: US 12,770,464 B2
(45) Date of Patent: Oct. 20, 2026

(54) FACILITATING WAGERING GAME PRIZES AND PROCESSES FOR CONFIGURING SAME

(71) Applicant: Primero Games, LLC, Norcross, GA (US)

(72) Inventor: Michael Mayo Macke, Duluth, GA (US)

(73) Assignee: Primero Games, LLC, Norcross, GA (US)

( * ) Notice: Subject to any disclaimer, the term of this patent is extended or adjusted under 35 U.S.C. 154(b) by 417 days.

(21) Appl. No.: 18/340,605

(22) Filed: Jun. 23, 2023

(65) Prior Publication Data

US 2024/0428652 A1 Dec. 26, 2024

(51) Int. Cl.
*G07F 17/32* (2006.01)
*G07F 17/34* (2006.01)

(52) U.S. Cl.
CPC ........ *G07F 17/3251* (2013.01); *G07F 17/329* (2013.01); *G07F 17/34* (2013.01)

(58) Field of Classification Search
CPC ............. G07F 17/3244; G07F 17/3251; G07F 17/329; G07F 17/34
See application file for complete search history.

(56) References Cited

U.S. PATENT DOCUMENTS 11,721,169 B2 8/2023 Macke
11,727,752 B2 8/2023 Macke
2007/0213124 A1* 9/2007 Walker .................... G07F 17/32 463/25
2008/0119284 A1* 5/2008 Luciano ............. G07F 17/3248 463/25
2015/0243122 A1* 8/2015 Saffari ................ G07F 17/3202 463/17
2020/0302743 A1* 9/2020 Meister-Gronau ........................... G07F 17/3241

* cited by examiner

*Primary Examiner* — Robert E Mosser
(74) *Attorney, Agent, or Firm* — Bradley Arant Boult Cummings LLP; Adam J. Thompson, Esq.

(57) ABSTRACT

A system and method for providing wagering game prizes can include a memory and a computing device in communication with the memory. The computing device can, responsive to receiving an input, modify a current credit meter based on a bet amount. The computing device can generate an outcome of a wagering game. Subsequent to generating the outcome, the computing device can receive a request to perform a payout event of the current credit meter. The computing device can determine a first payout amount based on a value of the current credit meter and preconfigured unit value for a first payment type. The computing device can initiate a first payout of the first payment type of the first payout amount. The computing device can initiate a second payout of a second payment type of a remainder amount based on the value of the current credit meter less the first payout amount.

20 Claims, 4 Drawing Sheets

FACILITATING WAGERING GAME PRIZES AND PROCESSES FOR CONFIGURING SAME

TECHNICAL FIELD

The present systems and methods relate generally to configuring wagering game prizes.

BACKGROUND

Previous approaches to providing wagering game prizes typically rely on dispensing currency or voucher therefore. However, such determinate outcomes may prematurely conclude the amusement experiences provided by wagering games. For example, by previous approaches, a wagering game may conclude with a patron being provided a particular amount of currency that corresponds to an outcome of the wagering game. In this example, the patron's amusement experience may initiate with generating the outcome of the wagering game and conclude with payout of the particular amount. Extending the gaming experience beyond payout may elevate patron amusement and advantageously increase patron retention and replay.

Therefore, there is a long-felt but unresolved need for a system or process for providing wagering game prizes that can more effectively extend patrons' amusement experiences.

SUMMARY OF THE DISCLOSURE

The present systems and methods relate generally to facilitating prizes and prize payouts in a gaming environment. Briefly described, and according to one embodiment, aspects of the present disclosure relate generally to systems and methods for determining wagering game prizes, and for configuring payout of wagering game prizes.

The gaming systems and gaming devices described herein can perform various actions and processes responsive to receiving one or more inputs from a patron. The gaming system can determine a bet amount based on patron input. For example, the gaming system determines a bet amount based on an amount of the current credits on the gaming device and/or and a selection to a graphical user interface (GUI) or particular button associated with the gaming device. The gaming system can modify a current credit meter based on the bet amount. For example, in response to a gaming device receiving a redemption of $5 and a selection for a maximum bet amount, the gaming system can increment the current credit meter by $5 (e.g., or other value corresponding to the maximum bet amount).

The gaming system can generate an outcome of the wagering game. As an example, the gaming system can generate a combination of particular indicia from a plurality of indicia rendered across a display of reels. The gaming system can determine a prize amount based on the outcome and the current credit meter. The prize amount can include a first payout amount of a first payment type and a second payout amount of a second payment type (e.g., and potentially additional payout amounts of different or similar payment types). As described herein, the gaming system can limit the first payout amount, or any payout amount, to a predetermined multiple, such as a predetermined multiple of accrued hand count credits (e.g., as tracked by the gaming system via one or more meters and/or user accounts).

The first payout amount can include a particular amount of fiat currency. The first payout amount can include a voucher for a particular amount of fiat currency or a spendable inventory credit equal to, or at another predetermined ratio to, the particular amount of fiat currency. As a particular example, the first payout amount can be a voucher for $5 worth of consumer products from the operator or venue with which the gaming system and gaming device are associated.

The second payout amount can include an asset having a particular value based on the current credit meter and/or the outcome of the wagering game. The asset can include a lottery ticket conveying admittance to a lottery drawing or an instant lottery ticket conveying entitlement to an amount printed thereon (e.g., also known as a "scratch-off" lottery ticket). The second payout amount, including a face value thereof, can be based on a remainder value of the current credit meter following a decrement of the first payout amount from the current credit meter. For example, a gaming device includes a current credit meter of $25 and a current hand count meter of four hand count credits. Based on the current credit meter and current hand count meter, the gaming system can determine a first payout amount of $20 (e.g., arrived at by limiting the first payout amount to a predetermined multiple of $5 per hand count credit). The gaming system can decrement the first payout amount, $20, from the current credit meter, $25, to determine a remainder amount of $5. The gaming system can determine the second payout amount to be an asset with a face value equal to the remainder amount. For example, the gaming system can determine the second payout amount to be a lottery ticket having a face value of $5. Alternatively, the gaming system can determine the second payout amount to be five lottery tickets, each having a face value of $1 (e.g., or any other suitable combination of lottery tickets having a collective face value equal to the remainder amount).

The gaming system, or gaming device, can provide first payout amount to the patron by printing a scannable ticket that can be redeemed for the first payout amount. Alternatively or in addition, the gaming system can write the first payout amount to a patron credential (e.g., a card, badge, computing device, etc.) or update a user account associated with the patron, or potentially other means. The gaming system, or gaming device, can provide the second payout amount by printing the asset (e.g., a lottery ticket), dispensing the asset from a reservoir (e.g., a reel of lottery tickets), updating a user account associated with the patron (e.g., to provide a virtual embodiment of or entitlement to the asset), or potentially other means.

BRIEF SUMMARY OF THE DRAWINGS

For a more complete understanding of the embodiments and the advantages thereof, reference is now made to the following description, in conjunction with the accompanying figures briefly described as follows.

Figure 1:
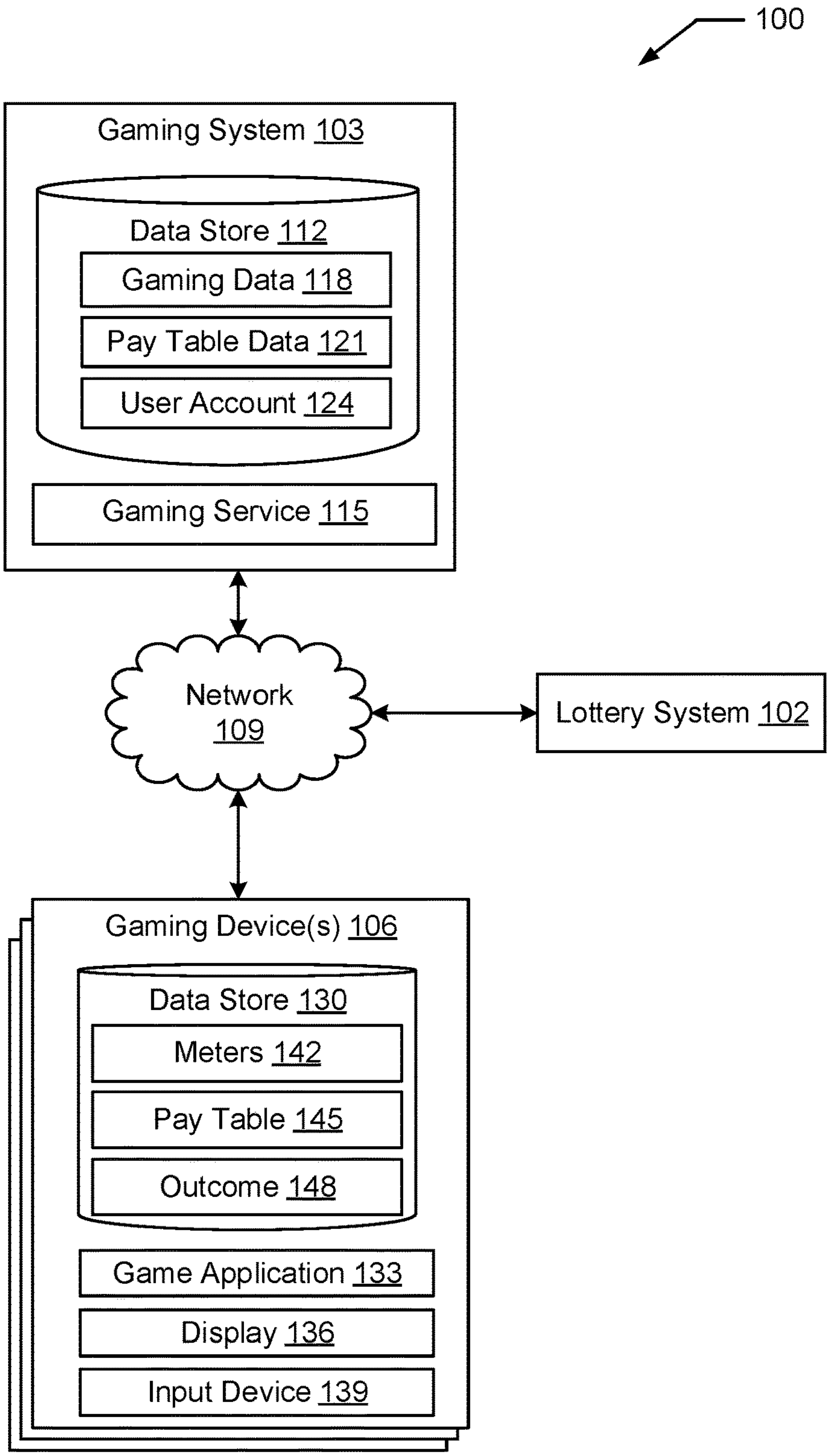
FIG. 1 shows an exemplary network environment in which gaming systems and gaming devices described herein may operate, according to one embodiment of the present disclosure.

The drawings illustrate only example embodiments and are therefore not to be considered limiting of the scope described herein, as other equally effective embodiments are within the scope and spirit of this disclosure. The elements and features shown in the drawings are not necessarily drawn to scale, emphasis instead being placed upon clearly illustrating the principles of the embodiments. Additionally, certain dimensions may be exaggerated to help visually convey certain principles. In the drawings, similar reference numerals between figures designate like or corresponding, but not necessarily the same, elements.

DESCRIPTION OF THE DRAWINGS

In the following paragraphs, the embodiments are described in further detail by way of example with reference to the attached drawings. In the description, well-known components, methods, and/or processing techniques are omitted or briefly described so as not to obscure the embodiments. As used herein, the "present disclosure" refers to any one of the embodiments described herein and any equivalents. Furthermore, reference to various feature(s) of the "present embodiment" is not to suggest that all embodiments must include the referenced feature(s).

Among embodiments, some aspects of the present disclosure are implemented by a computer program executed by one or more processors, as described and illustrated. As would be apparent to one having ordinary skill in the art, one or more embodiments may be implemented, at least in part, by computer-readable instructions in various forms, and the present disclosure is not intended to be limiting to a particular set or sequence of instructions executed by the processor.

The embodiments described herein are not limited in application to the details set forth in the following description or illustrated in the drawings. The disclosed subject matter is capable of other embodiments and of being practiced or carried out in various ways. Also, the phraseology and terminology used herein is for the purpose of description and should not be regarded as limiting. The use of "including," "comprising," or "having" and variations thereof herein is meant to encompass the items listed thereafter, additional items, and equivalents thereof. The terms "connected" and "coupled" are used broadly and encompass both direct and indirect connections and couplings. In addition, the terms "connected" and "coupled" are not limited to electrical, physical, or mechanical connections or couplings. As used herein, the terms "machine," "computer," "server," and "work station" are not limited to a device with a single processor, but may encompass multiple devices (e.g., computers) linked in a system, devices with multiple processors, special purpose devices, devices with various peripherals and input and output devices, software acting as a computer or server, and combinations of the above. As used herein, the term "stated" is meant to indicate that a value, indicia, or other data is viewable and/or accessible to a patron. As used herein, the term "unstated" is meant to indicate that a value, indicia, or other data is not viewable and/or accessible to a patron. For descriptive purposes, various gaming system functions are described as being performed by particular gaming elements; however, no limitation of function of gaming elements is intended, and functions performed by one element of a gaming system may be performed by other elements of the gaming system, as would be appreciated and understood by one of general skill in the art.

Referring now to the figures, for the purposes of example and explanation of the fundamental processes and components of the disclosed systems and processes, reference is made to FIG. 1, which shows an exemplary network environment 100 gaming system 103 and one or more gaming devices 106 may operate. As will be understood and appreciated, the exemplary network environment 100 shown in FIG. 1 represents merely one approach or embodiment of the present system, and other aspects are used according to various embodiments of the present system.

The gaming system 103 is in data communication with the gaming device 106 and lottery system 102 via one or more networks 109. The network 109 includes, for example, the Internet, intranets, extranets, wide area networks (WANs), local area networks (LANs), wired networks, wireless networks, or other suitable networks, etc., or any combination of two or more such networks. For example, such networks can include satellite networks, cable networks, Ethernet networks, and other types of networks. The network environment 100 can include one or more lottery systems 102. The gaming system 103 and/or gaming devices 106 can communicate with the lottery system 102 over one or more networks 109.

The lottery system 102 can be any system or service configured to facilitate and resolve lottery games, including instant lottery games and drawing-based lottery games. The lottery system 102 can activate a lottery ticket, or a batch of lottery tickets, in response to receiving an activation identifier. The lottery system 102 can resolve or redeem a lottery ticket in response to receiving a lottery ticket identifier (e.g., which may be the same as or different from the activation identifier). The lottery system 102 can determine whether an instant lottery ticket is associated with a prize based on the lottery ticket identifier and a stored record of prizes and identifiers associated therewith. The lottery system 102 can determine whether a draw-based lottery ticket is associated with a prize by comparing a drawing identifier of the lottery ticket is associated with a winning drawing identifier. The lottery system 102 can transmit indications of prize association and prize amounts to the gaming service 115.

The lottery system 102 can receive and authenticate data that is associated with disbursements of lottery tickets from the gaming device 106. The lottery system 102 can receive a count of lottery tickets disbursed from the gaming device 106 and a total value of currency or other payment collected and/or retained therefore. The lottery system 102 can determine a total face value of the count of lottery tickets based on a unit value corresponding to each type and/or quantity of lottery tickets. The lottery system 102 can determine whether the total face value of the count of lottery tickets is equal to the total value of currency or other payment collected therefore. As another example, the lottery system 102 can receive a current quantity of lottery tickets stored at the gaming device 106 (e.g., a value of current "batch size). The lottery system 102 can also receive a value for the quantity of lottery tickets disbursed from the gaming device 106. The lottery system 102 can retrieve a value for the original batch size of the lottery tickets stored at the gaming device 106 (e.g., batch size at time of batch activation). The lottery system 102 can determine whether the value of current batch size is equal to the value for the original batch size less the value for the quantity of lottery tickets disbursed. In some embodiments, one or more functions or processes of the lottery system 102 (e.g., or portions thereof) are performed by the gaming system 103 or gaming device 106.

The gaming device 106 can be a physical gaming device or an online gaming device. For example, in an online embodiment, the gaming device 106 can include games (wagering or not) hosted on one or more online pages. The gaming device 106 can include a portal for playing virtual wagering games. The gaming device 106 can transmit various data to the gaming system 103, including, but not limited to, patron inputs, additions of credits, coin-in amounts, bet amounts, patron identifiers, wagering game outcomes, and prize-related data (e.g., amount, quantity, type, disbursement method, lottery ticket identifiers, etc.).

The gaming system 103 can include a point of sale "POS" system, a server computer, or any other system providing computing capability. Alternatively, the gaming system 103 may employ computing devices that may be arranged in one or more server banks or computer banks or other arrangements. Such computing devices can be located in a single installation or may be distributed among many different geographical locations. For example, the gaming system 103 can include computing devices that together may include a hosted computing resource, a grid computing resource, and/or any other distributed computing arrangement. In some cases, the gaming system 103 can correspond to an elastic computing resource where the allotted capacity of processing, network, storage, or other computing-related resources may vary over time.

Various applications and/or other functionality may be executed in the gaming system 103 according to various embodiments. Also, various data is stored in a data store 112 that is accessible to the gaming system 103. The data store 112 can be representative of a plurality of data stores 112 as can be appreciated. The data stored in the data store 112 can be associated with the operation of the various applications and/or functional entities described below.

The components executed on the gaming system 103 can include a gaming service 115, and other applications, services, processes, systems, engines, or functionality not discussed in detail herein. Functions and operations described herein as being performed by the gaming system 103 may be performed by the gaming service 115. The gaming service 115 can be executed to monitor game play on the one or more gaming devices 106, perform or control payout events, and communicate with the lottery system 102, among other features. The gaming service 115 can perform processes described herein, such as the wagering game process 300 shown in FIG. 3 and described herein. The gaming service 115 may be representative of a plurality of services, modules, or programs. The gaming service 115 may include, or communicate with, one or more external services or systems configured to perform one or more functions described herein. For example, the gaming service 115 can communicate with the lottery system 102 to activate, validate, and/or access lottery tickets.

The gaming service 115, or game application 133, can generate and modify meters 142 for tracking various data, such as, for example, hand counts, current credit, winnings, and lottery ticket quantities. The gaming service 115 can increment, decrement, and reset meters 142. The gaming service 115 can initiate wagering games in response to a patron input or other signal from the gaming device 106. The gaming service 115 can generate wagering game outcomes, such as rotational positions of one or more reels (e.g., each of the reels including a one or more indicia such that an alignment of the reels can provide an alignment of particular indicia). The gaming service 115 can provide prizes to a patron, or corresponding gaming device 106, based on one or more wagering game outcomes. The gaming service 115 can process an outcome 148 and pay table data 121 to determine a particular prize associated with the outcome 148 (e.g., a particular amount of fiat currency, wagering game credits, bonus wagering games, lottery ticket type, lottery ticket value, lottery ticket quantity, etc.).

The gaming service 115 can receive requests to perform payout events. The gaming service 115 can determine one or more payout amounts to be provided to the patron or gaming device 106. The gaming service 115 can determine a first payout amount based on a value of the current credit meter 142 and preconfigured unit value for a first payment type. The gaming service 115 can initiate a first payout of the first payment type in the first payout amount. The gaming service 115 can determine a second payout amount of a second payment type. The gaming service 115 can determine the second payout amount based on a remainder amount. The gaming service 115 can determine the remainder amount based on the value of the current credit meter 142 less the first payout amount.

In an exemplary scenario, subsequent to generating an outcome 148, the gaming service 115 receives an input to initiate a payout event. Based on the outcome 148 and pay table data 121, the gaming service 115 determines a credit award of forty-eight (48) credits. The gaming service 115 increments a credit award meter 142 to forty-eight credits. Based on the value of the current credit meter 142, the gaming service 115 determines a first payout amount of $45 dollars. The gaming service 115 initiates a first payout of the first payout amount by printing a ticket voucher. The gaming service 115 determines a second payout amount by computing a remainder amount. The gaming service 115 subtracts the first payout amount, $45, from the current credit meter 142 (e.g., the first payout amount being considered at a 1:1 unit value, or other suitable ratio), thereby determining a remainder amount of three (3) credits. The gaming service 115 initiates a second payout of the second payout amount by printing or dispensing, via the gaming device 106, a lottery ticket having a face value of $3 (e.g., or another suitable combination of lottery ticket quantities and face values).

The gaming service 115 can monitor quantities of lottery tickets stored at one or more gaming devices 106. The gaming service 115 can generate and manage one or more lottery ticket meters 142 for tracking lottery ticket reserves and disbursements. The gaming service 115 can generate reports of wagering games, outcomes 148, payout-related data, and potentially other information. The gaming service 115 can generate a report that includes a current value of a lottery ticket meter 142 and an initial value of the lottery ticket meter 142 (e.g., such as a value of the lottery ticket meter 142 at a particular time period, such as the start of a 24-hour cycle, 12-hour cycle, or other suitable point). The gaming service 115 can store reports at the data store 112. The gaming service 115 transmit reports to external computing devices and systems, such as the lottery system 102.

The gaming service 115 can transmit lottery ticket-related information to the lottery system 102. The gaming service 115 can activate a lottery ticket, or batch thereof, by transmitting one or more lottery ticket identifiers to the lottery system 102 (e.g., and potentially other data, such as a security key or merchant identifier). The gaming service 115 and lottery system 102 can communicate via a cryptographic schema, such as public key infrastructure (PKI). The lottery system 102 can activate a lottery ticket by suitable means such that the lottery ticket can be validly redeemed by a patron (e.g., upon the gaming device 106 dispensing the lottery ticket to the patron).

The gaming service 115 can redeem lottery tickets by communicating with the lottery system 102. The gaming service 115 can receive, via the gaming device 106 or another computing device, a lottery ticket identifier. The gaming service 115 can transmit the lottery ticket identifier to the lottery system 102. The gaming service 115 can receive, from the lottery system 102, an indication of a prize associated with the lottery ticket identifier (e.g., or an indication that the lottery ticket identifier is not associated with a prize). The prize can include, but is not limited to, an amount of fiat currency, an entitlement to an additional lottery ticket, or an entitlement to other physical or digital goods.

The data stored in the data store 112 can include gaming data 118, pay table data 121, user accounts 124, and potentially other data. The gaming data 118 may include any data related to activities occurring at gaming devices 106 (e.g., the gaming data 118 may be an aggregation of all data from all gaming devices 106). The gaming data 118 can include any information related to a patron's engagement with gaming devices or wagering games, such as, for example, patrons inputs, metadata of inputs (e.g., timestamp, frequency, input device 139 used, location of input, etc.), wagering game outcomes, wagering game awards or prizes won.

The gaming data 118 can include indications of lottery tickets or other awards dispensed from gaming devices 106, such as vouchers conveying entitlement to a currency payout, a lottery ticket, or other physical or digital good. The gaming data 118 can include a lottery ticket batch identifier corresponding to a lottery ticket batch currently, historically, or planned to be stored in a gaming device 106. The gaming data 118 can include one or more lottery ticket identifiers corresponding to lottery tickets currently stored within or having been dispensed from or redeemed at the gaming device 106. The gaming data 118 can include a type of lottery ticket currently stored within or being used as a prize by the gaming device 106. The gaming data 118 can include a face value of the lottery ticket, or type thereof. The gaming data 118 can include meters 142 for each gaming device 106, or a grouping thereof. The gaming data 118 can include a current credit meter 142, a lottery ticket meter 142, and/or a coin-in meter 142. The gaming data 118 can include an original quantity of lottery tickets loaded into and/or assigned to a gaming device 106 (e.g., a value referenced herein as "original batch size"). The lottery ticket meter 142 can track an amount of lottery tickets disbursed from the gaming device 106 (e.g., as a standalone value or as a delta measured from the original batch size).

The pay table data 121 can include indicia, indicia combinations, and associations of indicia combinations to awards, such as points, currency, or other prizes. The indicia can be any media, including, but not limited to, images, videos, audio recordings, and combinations thereof. The indicia combinations can be any suitable sequence of indicia, including a sequence comprising a single indicium. The pay table data 121, or a pay table derived therefrom, can be stated or unstated.

The user account 124 can include authentication credentials, a user identifier, contact information, user preferences, or other identifying information. The user identifier can correspond to an identifier stored in a magnetic strip of a patron tracking card. The user account 124 can include one or more identifiers that associate the user account 124 with a particular patron (e.g., or an asset held thereby, such as a tracking card or computing device). Based on input, such as a patron inserting a player's card with a patron identifier into a player tracking module, the game application 133 (e.g., or a system in communication therewith) can retrieve a user account 124 that corresponds to the patron identifier. For example, the gaming device 106 receives a patron identifier and retrieves a user account 124 with which the patron identifier is associated. In another example, a ticket is inserted into the gaming device 106, and the game application 133 reads the ticket to retrieve a user identifier stored on the ticket. In yet another example, the patron identifier can be received via a mobile device using near field communication or read from an RFID tag, such as a RFID-tagged badge.

The user account 124 can include records of prizes previously awarded to the corresponding patron. The user account 124 can include historical payout events, payout amounts, and payment types. The user account 124 can include digital prizes and/or digital certificates conveying entitlement to or ownership of a physical or digital asset. The user account 124 can include a digital certificate that establishes a patron's entitlement to a physical or virtual instant lottery ticket or a physical or virtual lottery ticket for a lottery drawing.

The gaming device 106 is representative of one or more gaming devices that may be coupled to the network 109. The gaming device 106 can include an amusement device, a slot machine, or other gaming device with a processor-based system such as a computer system. Such a computer system may be embodied in the form of a computing device in a slot machine cabinet, a desktop computer, a laptop computer, personal digital assistants, cellular telephones, smartphones, set-top boxes, music players, web pads, tablet computer systems, game consoles, electronic book readers, or other devices with like capability.

The gaming device 106 can include, but is not limited to, a data store 130, a game application 133, one or more displays 136, one or more input devices 139, among other components. The data store 130 can store meters 142, pay tables 145, outcomes 148, and potentially other data, such as patron identifiers, lottery ticket identifiers, lottery ticket batch identifiers, lottery ticket face values, and settings for configuring payout amounts and payment types.

The meters 142 can include an amount of money wagered on the gaming device 106 referred to as coin-in. The meters 142 can include an amount and/or asset quantity, or value thereof, disbursed by the gaming device 106 referred to as coin-out or payout amount. The meters 142 can include an amount of currency or other credit currently on the gaming device 106 and/or eligible for payout, referred to as current credits. The meters 142 can include counts of lottery tickets previously and currently stored at the gaming device 106 or otherwise associated therewith. The meters 142 can include various jackpot and bonus information, among other meters.

The meters 142 can include a count of games played on the gaming device 106 referred to as hand count. The hand count can correspond to a number of games played in a current gaming session and can be a data object that is not presented to and is inaccessible by a patron. Accrued hand counts can be tracked by the game application 133, via a meter 142 and provided to the gaming service 115. A gaming session can start with the insertion of credits onto a game, with the authentication of a user account, or when some other trigger occurs. A gaming session can terminate when a patron cashes out a machine, when a patron logs out of the gaming devices, or some other trigger occurs. In one example, when credits are initially received by the game application 133, the hand count can be initialized to zero. The hand count can be initialized to or incremented by a hand count credit transferred from another gaming device 106 or gaming session. In some embodiments, the hand count can be determined as a delta of the current games played plus a buffer value minus initial games played from when the gaming session started. The buffer value can correspond to hand count transferred from another gaming device 106 or gaming session. Each time a payout is performed, the game application 133, or gaming service 115, can decrement the meter 142 for tracking the patron's hand counts (e.g., the hand counts being redeemed at a fixed unit value to disburse a payout amount from a current credit amount).

The pay table 145 can record and indicate associations between outcomes 148 and wagering game prizes. The game application 133 or gaming service 115 can generate the pay table 145 based on pay table data 121. In some embodiments, the pay table 145 can be visible or invisible and inaccessible to the patron. The pay table 145 can indicate options for performing a payout event, such as options for initiating payout in a first payment type, a second payment type, or a combination thereof.

The outcome 148 can include an outcome of a wagering game, such as particular combinations of indicia. The outcome 148 can include historical outcomes of previous or current wagering games. The outcome 148 can include one or more particular indicium associated with a particular prize. For example, the outcome 148 can include a particular indicium that is associated with a free lottery ticket. As another example, the outcome 148 can include a particular indicium associated with initiating a bonus game or free wagering game.

The display 136 can include one or more devices such as liquid crystal display (LCD) displays, gas plasma-based flat panel displays, organic light-emitting diode (OLED) displays, electrophoretic ink (E ink) displays, LCD projectors, or other types of display devices, etc. The input device 139 can include, but is not limited to, one or more buttons, one or more levers, a touch screen (e.g., including three-dimensional or pressure-based touch screens), a camera, a biometric capture device (e.g., fingerprint scanner, facial scanner, etc.), an accelerometer, a gesture tracking device, a gyroscope, a magnetometer, or other input device. The input device 139 can also include a bill acceptor, a player tracking module, a ticket printer, a lottery ticket printer or dispenser, a radio frequency identification (RFID) reader-writer device, and potentially other devices.

The gaming device 106 can be configured to execute various applications, such as the game application 133 and/or other applications. In some embodiments, the game application 133 can include a browser, a dedicated application, etc., and the user interface can be a network page, an application screen, etc. The gaming device 106 can be configured to execute applications beyond the game application 133 such as, for example, a patron tracking service window application, email applications, social networking applications, word processors, spreadsheets, and/or other applications.

The game application 133 may be executed in a gaming device 106, for example, to access network content served up by the gaming system 103, and/or other servers, thereby rendering various user interfaces on the display 136. The game application 133 can render the pay table 145 on the display 136. The game application 133 can render, on the display 136, one or more reels. The reel can include indicia, such as a set of assorted symbols (see, e.g., gaming device 106 shown in FIG. 2 and described herein. The game application 133 can render, on the display 136, a subset of the indicia (e.g., a first subset of the indicia may be stated, and a second subset may be unstated). The stated subset of the indicia can be mutually exclusive with a remaining, unstated subset of the indicia. In some embodiments, the subset of the stated indicia is non-mutually exclusive with a remaining, unstated subset of the indicia (e.g., a reel may include multiple instances of the same indicium).

The game application 133 can initiate wagering games in response to an input (e.g., received via the input device 139 or from the gaming service 115). The game application 133 can generate or facilitate an outcome 148 of the wagering game. The game application 133 can generate the outcome 148 based on an algorithm and a pseudorandom seed value. The game application 133 can generate a pseudorandom seed value or receive the pseudorandom seed value from the gaming service 115. The game application 133 can process the pseudorandom seed value via one or more algorithms to determine a final position of one or more reels (e.g., or other wagering game variables for determining the outcome 148). The game application 133 can determine the outcome 148 of the wagering game by processing the final positions of the reels and pay table data 121 corresponding to the wagering game being played. The game application 133 can render the reels on the display 136 at their respective final positions (e.g., potentially including a rotation or other movement animation between initial and final reel positions).

In some embodiments, the game application 133 initiates skill stop-type wagering games. The game application 133 can render a one or more of reels on the display 136 (e.g., the rendering of each reel including a subset of the indicia). The game application 133 can rotate the reels on the display 136. The game application 133 can stop the rotation of the reels based on one or more user inputs. The game application 133 can determine an outcome 148 of the wagering game based on the stopped position of each of the reels. For example, the game application 133 can identify a sequence of aligned indicia from the reels and determine the outcome 148 based on the sequence as compared to pay table data 121. The game application 133 can determine the outcome 148 of the wagering game based on one or more indicia that, upon stoppage of the one or more reels, are aligned with a pay line or selection object. The game application 133 can detect a collision between a selection object and a hitbox corresponding to an indicium of a reel. The game application 133 can stop the reel at a particular position corresponding to the particular indicia and the hitbox. The game application 133 can stop the movement of the selection object in response to an input device 139, and potentially other data. In response to stopping the selection object, the game application 133 can determine the outcome 148 based on pay table data 121 and a collision of the selection object with a hitbox corresponding to one or more particular indicia of one or more reels.

The game application 133, and/or gaming service 115, can initiate and perform payout events. The game application 133 can receive one or more inputs for initiating payout events or configuring payout event properties (e.g., payment type, payout amount, etc.). The game application 133 can configure payout events based on the one or more inputs. Further exemplary features and aspects of payout events are described herein with reference to FIGS. 2-3.

Figure 2:
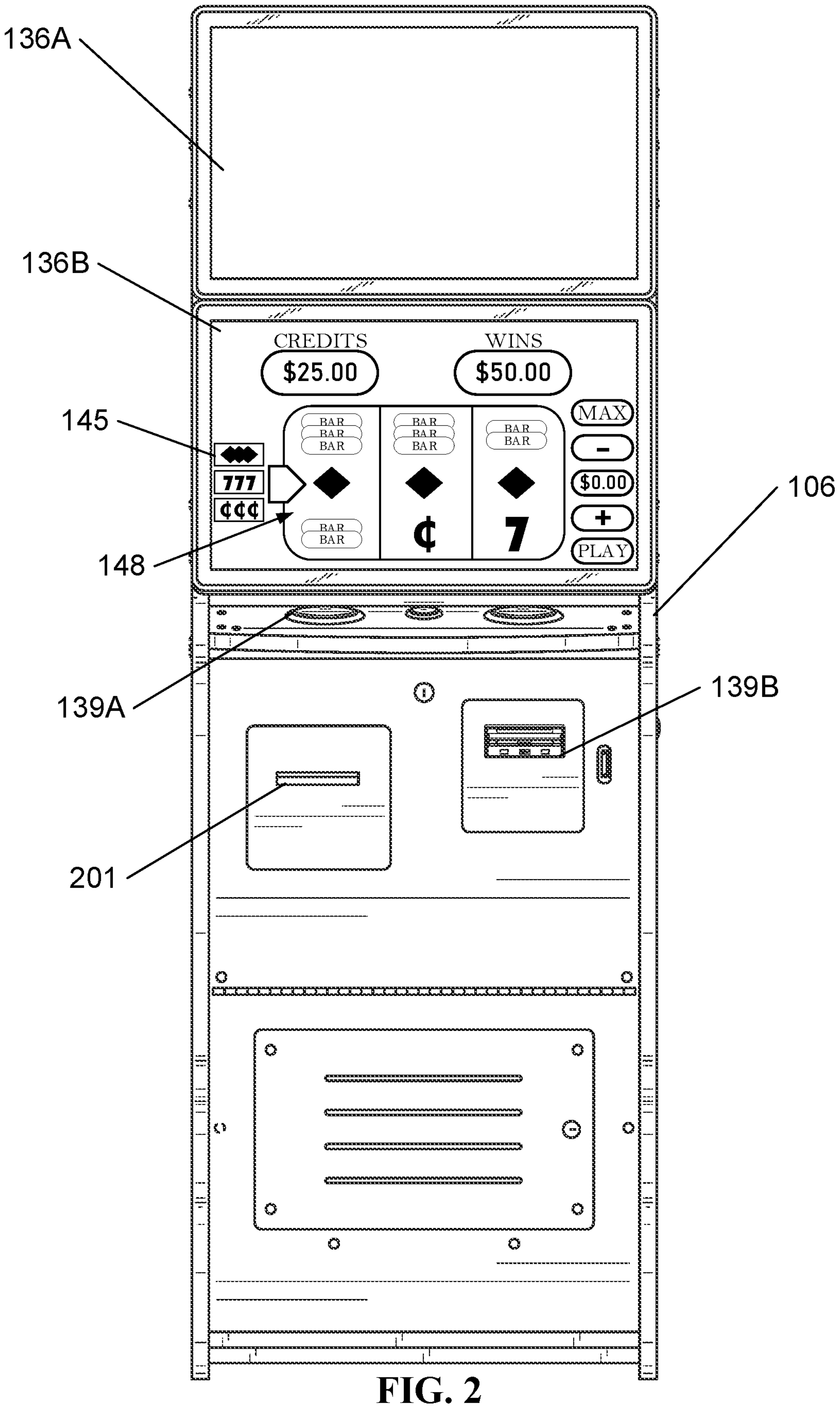
FIG. 2 shows an exemplary gaming device, according to one embodiment of the present disclosure.

FIG. 2 shows an exemplary gaming device 106. The gaming device 106 can include a first display 136A and a second display 136B. The gaming device 106 can include one or more input devices 139A, 139B. The input device 139A can include one or more buttons, for example. The input device 139B can be a bill acceptor, ticket acceptor, RFID reader-writer device, or combination thereof. In some embodiments, the input device 139B, or another input device, is configured to scan a lottery ticket to obtain an identifier (e.g., for lottery ticket redemption or lottery ticket activation purposes). The gaming device 106 can include one or more printers 201. The printer 201 can print prizes including, but not limited to, prize voucher and lottery tickets, such as drawing-type lottery tickets. The printer 201 can be, or can include, a dispenser device configured to dispense lottery tickets or other asset-based prizes. For example, the game application 133 can command the printer 201 to print or dispense a particular quantity and/or type of lottery ticket for a remainder value based on a current credit meter value less a credit payout amount.

The gaming device 106, via the game application 133, can generate one or more outcomes 148 for one or more wagering games in response to receiving an input from a patron via the input device 139A and/or input device 139B. The gaming device 106 can display the one or more outcomes 148 on the display 136A and/or display 136B. The gaming device 106 can display a pay table 145 on the display 136A or display 136B to indicate potential outcomes 148 and, in some embodiments, prizes associated therewith.

For each initiated wagering game, the game application 133, or other element connected thereto, can determine a prize based on the corresponding outcome 148 of that wagering game and increment a current credit meter 142 based on the determined prize. For each initiated wagering game, the game application 133 can also increment a hand counter meter 142. Responsive to a request to perform a payout event, the game application 133 can initiate a payout event to disburse, from the patron's accrued prizes, a first payout of a first payment type and a second payout of a second payment type. In some embodiments, the game application 133 can perform a single payout in a single payment type. For example, the game application 133 can perform a payout event in which an entirety of a current credit meter (e.g., or another amount based on accrued hand count credits) is disbursed via dispensing one or more lottery tickets.

The game application 133 can determine an amount for the first payout based on a current value of the credit meter and a preconfigured unit value for the first payment type (e.g., $1 per 1 credit, $5 per 1 credit, or any suitable ratio). The gaming device 106 can initiate payout of the first payout amount by dispensing an amount of currency in the first payout amount (e.g., or by printing a voucher therefore, or by updating a user account associated with the patron).

The game application 133 may restrict the value of the first payout amount to a value equal to a predefined multiple, such as a multiple of a number of wagering games initiated by the patron (e.g., as tracked via a hand count meter 142). For example, the gaming device 106 may restrict the first payout amount to an asset, or quantity thereof, whose value is equal to $5 times the number of wagering games initiated by the patron (e.g., a value also referred to herein as "hand counts" or "hand count credits."). Accordingly, there may be an incentive for a patron to achieve a sufficient number of hand counts such that a full value of a payout may be received.

The game application 133 can determine the second payout based on a remainder amount equal to the value of the current credit meter less the first payout amount. The gaming device 106 can disburse, to the patron, an asset, or plurality of assets, whose value is equal to the remainder amount. The asset can include one or more lottery tickets (e.g., having a face value equal to the remainder amount). The gaming device 106 can communicate with a lottery system to initiate and complete a transaction for the lottery ticket(s). The game application 133, via the printer 201, can print the lottery ticket(s) or a voucher conveying entitlement to the lottery ticket(s) (e.g., which may be redeemed by the patron via exchange with a lottery vendor). Alternatively, the game application 133, or gaming service 115, can update a user account 124 to include a digital lottery ticket, or a digital certificate conveying the patron's entitlement to a lottery ticket.

Figure 3:
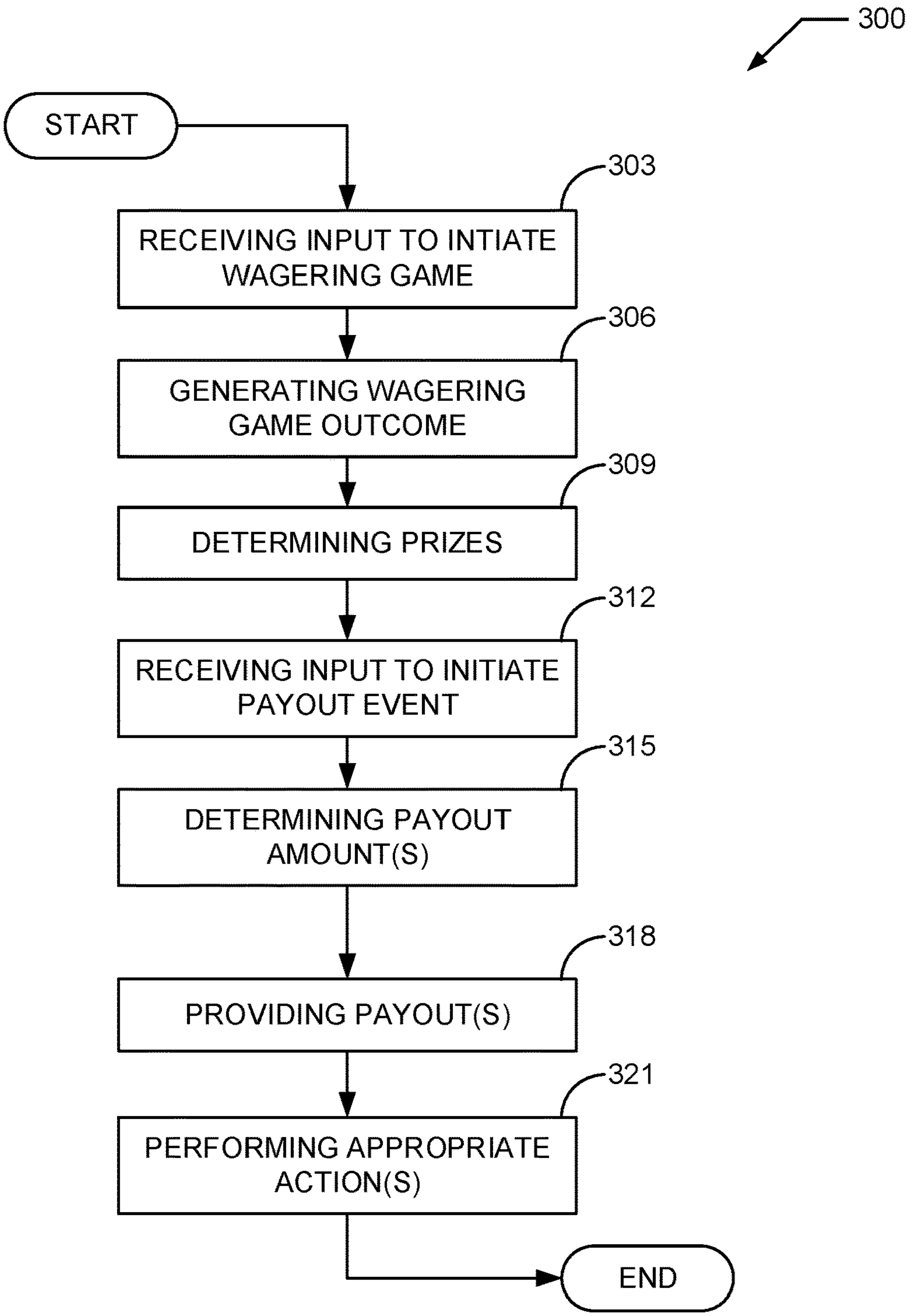
FIG. 3 shows an exemplary wagering game process, according to one embodiment of the present disclosure.

Before turning to the processes shown in FIG. 3 it is noted that embodiments described herein may be practiced using an alternative order of the steps illustrated in FIG. 3. That is, the process flows illustrated in FIG. 3 are provided as examples only, and the embodiments may be practiced using process flows that differ from those illustrated. Additionally, it is noted that not all steps are required in every embodiment. In other words, one or more of the steps may be omitted or replaced, without departing from the spirit and scope of the embodiments. Further, steps may be performed in different orders, in parallel with one another, or omitted entirely, and/or certain additional steps may be performed without departing from the scope of the embodiments.

FIG. 3 shows an exemplary wagering game process 400 that can be performed by the gaming system 103, the gaming device 106, or in combinations thereof. As described in the aforementioned section, some embodiments of the process 300 may omit or repeat one or more steps 303-321.

For example, an embodiment of the process 300 can include steps 312-321. The game application 133 can receive a request to perform a payout event of a current credit meter 142. The game application 133 can determine a first payout amount based on a value of the current credit meter 142 and a preconfigured unit value for a first payment type. The game application 133 can initiate a first payout of the first payment type of the first payout amount. The game application 133 can initiate printing of at least one lottery ticket for a remainder amount based on the value of the current credit meter less the first payout amount. The game application 133 can perform additional appropriate actions, such as modifying one or more meters 142, gaming data 118, and/or a user account 124 based on the payout event.

At step 303, the process 300 includes receiving an input to initiate a wagering game. The input can include one or more inputs. For example, the input can include a ticket inserted via a bill acceptor and one or more selections to a graphical user interface. The input can include, or convey, various data including, but not limited to, a selection for a type of wagering game, a patron identifier, a bet amount, an amount of accrued hand count credits, an amount of coin-in credits, and amount of credits put onto the gaming device 106, and an amount of prize- or other payout-related credits. The input can include a request to initiate a wagering game.

The game application 133 can receive the input via one or more input devices 139. For example, the game application 133 can receive the input via a ticket inserted to a bill acceptor. The game application 133 can process the ticket to determine or extract various data including, but not limited to, a patron identifier, an amount of accrued hand count credits, an amount of coin-in credits, and an amount of prize, or other payout-related credits. The game application 133 can communicate with the gaming service 115 to determine various data, such as the amount of accrued hand count credits, amount of coin-in credits, or amount of prize- or other payout-related credits. For example, the game application 133 can transmit the patron identifier to the gaming service 115. The gaming service 115 can determine a user account 124 and/or a subset of gaming data 118 associated with the patron identifier. The gaming service can transmit the user account 124 (e.g., or various data associated therewith) and/or subset of gaming data 118 to the game application 133.

The game application 133 can modify one or more meters 142 based on the input. The input can include a coin-in amount. The game application 133 can increment a current credit meter 142 based on the coin-in amount. As another example, the input can include a bet amount. The game application 133 can decrement a current credit meter 142 based on the bet amount.

The game application 133 can authenticate the patron based on the input. The game application 133 can determine a user account 124 based on the input. The game application 133 can verify that the patron is associated with the user account 124 based on the input. For example, the input can include a credential. The game application 133 can compare the credential to the user account 124 and (de) authenticate the patron based on the comparison. The game application 133 can modify one or more meters 142 based on the user account. For example, the application 133 can increment a hand counter meter 142 based on an amount of hand count credits stored in association with the user account 124. As another example, the application 133 can increment a current credit meter 142 based on an amount of credits (e.g., or prizes conferring credits) stored in association with the user account 124.

At step 306, the process 300 includes generating an outcome 148 of the wagering game. As an example, the game application 133 can generate an outcome 148 of the wagering game and render the results on the display 136. The game application 133 can modify one or more meters in response to generating the outcome 148. For example, the game application 133 can increment a hand credit meter 142. The game application 133 can decrement a coin-in meter 142. The game application 133 can decrement a current credit meter 142 (e.g., based on a bet amount). As further described herein with reference to steps 309-321, the game application 133 can modify a current credit meter 142 based on the outcome 148, prizes obtained based thereon, or payout event(s) initiated. In some embodiments, generating the outcome 148 includes rotating one or more reels and receiving one or more inputs to stop the rotation thereof, thereby aligning a subset of a plurality of indicia with a selection object (e.g., and/or determining collisions there between).

At step 309, the process 300 includes determining one or more prizes based on the outcome 148, and potentially other data. As an example, the prize can includes an amount of prize credits. The game application 133 can process the outcome 148, pay table data 121, a pay table 145, and/or a bet amount to determine an amount of credit associated with the outcome 148. The game application 133 can modify a current credit meter 142 based on the amount of credit associated with the outcome 148. The game application 133 can initiate one or more wagering games, thereby generating one or more outcomes 148. The game application 133 can modify the current credit meter 142 based on each outcome 148 (e.g., and/or a bet amount associated therewith).

The prize can include a free wagering game and/or a bonus game. The game application 133 can initiate the free wagering game or bonus game. The game application 133 can determine an outcome 148 of the free wagering game or bonus game. The game application 133 can determine one or more prizes associated with the free wagering game or bonus game and modify one or more meters 142 based thereon. The prize can include an amount of hand count credits and the game application 133 can modify a hand count meter 142 based thereon. The prize can include a free lottery ticket. The game application 133, or gaming service 115, can update a user account 124 to include an entitlement to the free lottery ticket. In some embodiments, the gaming device 106 can automatically dispense or print a free lottery ticket.

At step 312, the process 300 includes receiving an input to initiate a payout event. The game application 133 can receive, via the input device 139, an input for requesting initiation of a payout event. The game application 133 can automatically initiate a payout event. For example, the game application 133 can automatically initiate a payout event in response to determining that a current value of a meter 142 exceeds a predetermined threshold. As another example, the game application 133 can automatically initiate a payout event in response to determining an outcome 148 is associated with an instant win prize, such as a lottery ticket.

At step 315, the process 300 includes determining one or more payout amounts. The game application 133 can determine a first payout amount based on a value of the current credit meter 142 and a preconfigured unit value for a first payment type. The first payment type can include an amount of fiat currency, an amount of a physical asset (e.g., redeemable tokens, precious metals, etc.). The unit value can be any suitable ratio of wagering game credits (e.g., value of the current credit meter 142) to units of the first payment type. For example, the unit value can be $1, $2, $5, or any suitable value, to every credit of the current credit meter 142. The unit value can be based on the bet amount. For example, in response to the gaming device 106 receiving a minimum bet amount, the game application 133 can configure the unit value to a first value, such as $1. In the same example, in response to the gaming device 106 receiving have maximum bet amount, the game application 133 can configure the unit value to a second value, greater than the first value, such as $2.

In an exemplary scenario, the game application 133 determines a value of the current credit meter 142 to be twenty-five (25) credits. Based on the twenty-five credits and a preconfigured unit value of $1 per credit, the game application determines a first payout amount of $25 for the first payment type.

The game application 133 can modify and/or limit payout amounts based on various data, such as an amount of hand count credits associated with a patron, a user account 124 therewith, or one or more gaming devices 106 associated therewith. The game application 133 can track hand count credits via a hand count meter 142. For example, the game application 133 can determine a count of outcomes 148 generated during a session of one or more wagering games. The game application 133 can modify the first payout amount based on the value of the hand count meter 142. The game application 133 can determine a payout limit by multiplying the value of the hand counter meter 142 by a predetermined value (e.g., $1, $2, $5, $10, or any suitable value, per hand count credit). The game application 133 can modify the first payout to not exceed the payout limit. As further described herein, the game application 133 can determine a remainder amount by subtracting the first payout amount (e.g., in original or modified form) from the value of the current credit meter 142.

In an exemplary scenario, the game application 133 determines a first payout amount of $25. The game application 133 determines a current value of a hand count meter 142 to be four (4) hand count credits. The game application 133 multiplies the current value of the hand count meter 142 by a predetermined value of $5 per hand count credit, thereby determining a payout limit of $20. The game application 133 can modify the first payout amount to not exceed the payout limit of $20, thereby determining an updated first payout amount of $20.

The game application 133 can determine a second payout of a second payment type based on a remainder amount. The game application 133 can determine the remainder amount by differencing the value of the current credit meter 142 and the first payout amount. For example, the game application 133 can subtract a first payout amount of $20 from a current credit value of 25 credits, thereby determining a remainder amount of $5 (e.g., or another value or quantity based on a predetermined unit value for the second payment type). The game application 133 can calculate the remainder amount by rounding, to a unit value of the second payment type, the value of the current credit meter 142 less the first payout amount.

The game application 133 can determine the second payout based on the remainder amount. The game application 133 can determine a quantity of an asset to disburse for the second payout based on the remainder amount and a face value of the asset (e.g., on a singular quantity basis or other suitable quantity basis). For example, a potential wagering game prize can include lottery tickets having an individual face value of $1 per ticket. The game application 133 can determine a remainder amount of $5. Based on the $5 remainder amount and the $1 face value, the game application 133 can determine a second payout of five lottery tickets. The game application 133 can determine that the remainder amount is sufficient for redeeming different types of lottery tickets of same or differing face value. For example, the game application 133 can determine that a $5 remainder amount can be redeemed for five lottery tickets of a first type having a face value of $1 or one lottery ticket of a second type having a face value of $5. As another example, the game application 133 can determine that a $5 remainder amount can be redeemed for two lottery tickets of a first type having a face value of $2 and one lottery ticket of a second type having a face value of $1. The game application 133 can generate and render user interfaces including selectable options for configuring the second payout based on the remainder amount. The user interface can include selectable options for allocating the remainder amount toward various combinations of lottery tickets or other prize assets. The user interface can include win probabilities for instant-type lottery tickets. The user interface can include current reel numbers for each type of lottery ticket available for payout events. The user interface can include selectable options for configuring draw numbers and other draw factors for draw-type lottery tickets. The user interface can include draw schedules for draw-type lottery tickets. The game application 133 can compare the remainder amount to a face value and/or available quantity of one or more lottery prizes. Based on the comparison, the game application 133 can determine that one or more lottery prizes may be validly redeemed for the remainder amount and are therefore available for the second payout.

In some embodiments, the game application 133 determines the first payout amount and the second remainder amount based on the value of the current credit meter 142 and a predetermined ratio (e.g., 1:1, 1:2, 3:2, or any suitable ratio). In at least one embodiment, the game application 133 can receive an input for configuring allocation of the value of the current credit meter 142 into payout amounts of differing payment type. In some embodiments, in response to the value of the current credit meter 142 exceeding a predetermined threshold value, the game application 133 can automatically configure a payout amount based on the value of the current credit meter 142 less the predetermined threshold value.

At step 318, the process 300 includes providing one or more payouts, such as a first payout amount of a first payment type and a second payout of a second payment type. The game application 133 can dispense an amount of fiat currency in the first payout amount. The game application 133 can print a ticket that can be redeemed for an amount of fiat currency in the first payout amount. The game application 133 can electronically remit a payment to the user account 124 for an amount of fiat currency or cryptocurrency in the first payout amount.

The game application 133 can print one or more lottery tickets for the second payout. The game application 133 can communicate with the lottery system 102 to perform a transaction for purchasing the lottery ticket(s) via the remainder amount, or another amount based thereon). For draw-type lottery tickets, the game application 133 can receive lottery ticket data from the lottery system 102, such as a combination of draw numbers, a timestamp, a lottery ticket identifier, and potentially other data. The game application 133 can print one or more draw-type lottery tickets based on the lottery ticket data. The game application 133 can print or dispense a suitable quantity of instant- and/or draw-type based on the second payout determined at step 315. The game application 133 can communicate with a lottery ticket system 102 to activate instant-type lottery tickets prior to printing or dispensing. For example, the game application 133 can determine a lottery ticket identifier associated with a lottery ticket to be dispensed or printed. The game application 133 can transmit the lottery ticket identifier, and potentially other data, to the lottery system 102, thereby causing the lottery system 102 to activate the corresponding lottery ticket such that any prizes obtained therefrom may be validly redeemed.

In some embodiments, the game application 133 can process the lottery ticket to determine a prize amount (e.g., potentially a third payout amount). The game application 133 can receive the lottery ticket via a bill acceptor or other input device 139. The game application 133 can determine the lottery ticket identifier by scanning the lottery ticket. The game application 133 can process the lottery ticket identifier and pay table data 121, and potentially other data, to determine a prize amount. Alternatively, the game application 133 can transmit the lottery ticket identifier to the lottery system 102. The game application 133 can receive, from the lottery system 102, a prize amount corresponding to the lottery ticket. The game application 133 can increment a current credit meter 142 by the prize amount. The game application 133 can initiate a payout of the prize amount in one or more payment types, such as an amount of fiat currency, ticket therefore, or one or more additional lottery tickets.

At step 321, the process 300 includes performing one or more appropriate actions. The game application 133 can modify one or more meters 142 based on the payout event (s). The game application 133 can decrement a current credit meter 142 based on one or more payout amounts. The game application 133 can decrement a hand count meter 142 based on one or more expended hand count credits. The game application 133 can increment or decrement one or more lottery ticket meters 142 based on a quantity of lottery tickets printed or dispensed (e.g., the meters for tracking a remaining inventory of lottery tickets or for tracking a total count of lottery tickets issued).

The game application 133 can print and/or transmit a report based on the lottery ticket meter(s) 142. The game application 133 can transmit the report to the lottery system 102 or another computing system, such as a computing device associated with an owner or operator of the gaming device 106. The report can include, but is not limited to, a current value of the lottery ticket meter 142, an initial value of the lottery ticket meter 142 (e.g., as measured from start of business period, from activation of a batch comprising the lottery ticket(s), or another suitable measurement basis), count of lottery tickets sold of each ticket type, a reel number associated with an initial lottery ticket in a lottery ticket batch (e.g., as measured from start of business period, etc.), a reel number associated with a current lottery ticket in the lottery ticket batch (e.g., the lottery ticket that would next be issued from the lottery ticket batch), an amount of lottery ticket sales, a count of remaining lottery tickets, an indication of emptied lottery ticket batches, and potentially other data. In various embodiments, prior to the payout event, the gaming device 106 can receive, into a dispenser or hopper device, a batch of lottery tickets. In one or more embodiments, prior to or during the payout event, the game application 133 can receive and activate a lottery ticket or batch of lottery tickets comprising the lottery ticket.

Figure 4:
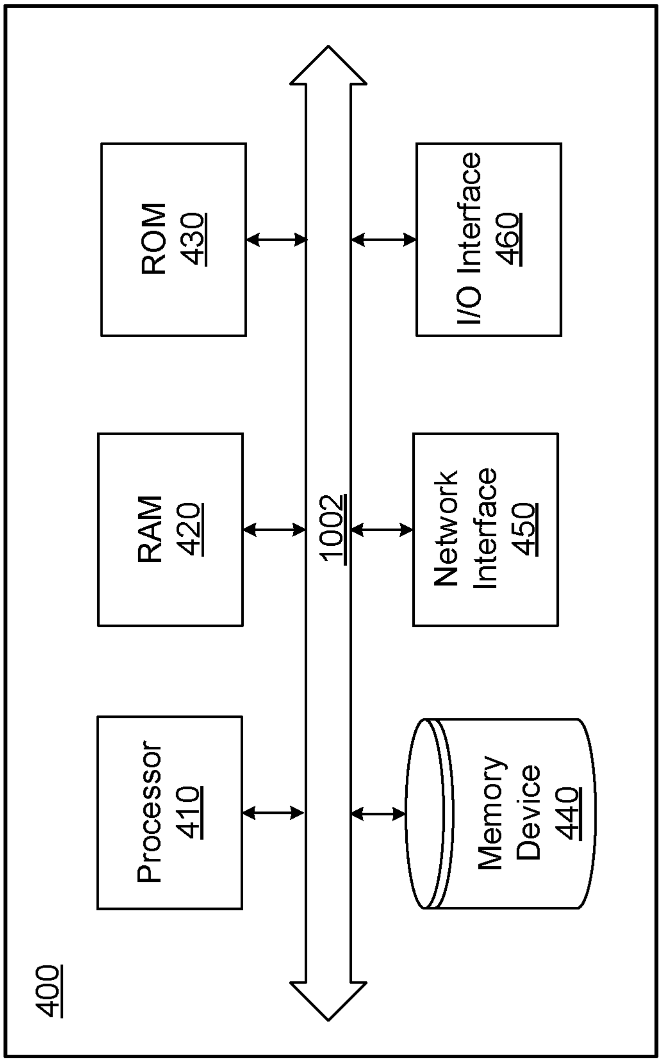
FIG. 4 shows an example hardware diagram of a computing device, according to one embodiment of the present disclosure.

Turning to FIG. 4, an example hardware diagram of a computing device 400 is illustrated. Any of the gaming system 103 or the gaming devices 106 may be implemented, in part, using one or more elements of the computing device 400. The computing device 400 can include one or more of a processor 410, a Random Access Memory ("RAM") 420, a Read Only Memory ("ROM") 430, a memory device 440, a network interface 450, and an Input Output ("I/O") interface 460. The elements of the computing device 400 are communicatively coupled via a bus 402.

The processor 410 can include an arithmetic processor, Application Specific Integrated Circuit ("ASIC"), or other types of hardware or software processors. The RAM 420 and ROM 430 can include a memory that stores computer-readable instructions to be executed by the processor 410. The memory device 440 stores computer-readable instructions thereon that, when executed by the processor 410, direct the processor 410 to execute various aspects of the present disclosure described herein. When the processor 410 includes an ASIC, the processes described herein may be executed by the ASIC according to an embedded circuitry design of the ASIC, by firmware of the ASIC, or both an embedded circuitry design and firmware of the ASIC. As a non-limiting example group, the memory device 440 comprises one or more of an optical disc, a magnetic disc, a semiconductor memory (i.e., a semiconductor, floating gate, or similar flash based memory), a magnetic tape memory, a removable memory, combinations thereof, or any other known memory means for storing computer-readable instructions. The network interface 450 can include hardware interfaces to communicate over data networks. The I/O interface 460 can include device input and output interfaces such as keyboard, pointing device, display, communication, and other interfaces. The bus 402 can electrically and communicatively couple the processor 410, the RAM 420, the ROM 430, the memory device 440, the network interface 450, and the I/O interface 460, so that data and instructions may be communicated among them.

In operation, the processor 410 is configured to retrieve computer-readable instructions stored on the memory device 440, the RAM 420, the ROM 430, or another storage means and copy the computer-readable instructions to the RAM 420 or the ROM 430 for execution, for example. The processor 410 is further configured to execute the computer-readable instructions to implement various aspects and features of the present disclosure. For example, the processor 410 may be adapted and configured to execute the processes described above with reference to FIG. 3, including the processes described as being performed by the gaming system 103 or gaming devices 106. Also, the memory device 440 may store the data stored in the data store 112 or 130.

A phrase, such as "at least one of X, Y, or Z," unless specifically stated otherwise, is to be understood with the context as used in general to present that an item, term, etc., can be either X, Y, or Z, or any combination thereof (e.g., X, Y, and/or Z). Similarly, "at least one of X, Y, and Z," unless specifically stated otherwise, is to be understood to present that an item, term, etc., can be either X, Y, and Z, or any combination thereof (e.g., X, Y, and/or Z). Thus, as used herein, such phrases are not generally intended to, and should not, imply that certain embodiments require at least one of either X, Y, or Z to be present, but not, for example, one X and one Y. Further, such phrases should not imply that certain embodiments require each of at least one of X, at least one of Y, and at least one of Z to be present.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present disclosure defined in the following claims, the scope of which are to be accorded the broadest interpretation so as to encompass modifications and equivalent structures.

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a general purpose computer, special purpose computer, specially-configured computer, mobile device, etc.

When information is transferred or provided over a network or another communications connection (either hardwired, wireless, or a combination of hardwired or wireless) to a computer, the computer properly views the connection as a computer-readable medium. Thus, any such connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, some of the embodiments of the claimed systems may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed system are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the systems are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the system is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed systems will be readily discernible from the description herein, by those of ordinary skill in the art. Many embodiments and adaptations of the disclosure and claimed systems other than those herein described, as well as many variations, modifications, and equivalent arrangements and methodologies, will be apparent from or reasonably suggested by the disclosure and the foregoing description thereof, without departing from the substance or scope of the claims. Furthermore, any sequence (s) and/or temporal order of steps of various processes described and claimed herein are those considered to be the best mode contemplated for carrying out the claimed systems. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed systems. In addition, some steps may be carried out simultaneously, contemporaneously, or in synchronization with other steps.

Aspects, features, and benefits of the claimed devices and methods for using the same will become apparent from the information disclosed in the exhibits and the other applications as incorporated by reference. Variations and modifications to the disclosed systems and methods may be effected without departing from the spirit and scope of the novel concepts of the disclosure.

It will, nevertheless, be understood that no limitation of the scope of the disclosure is intended by the information disclosed in the exhibits or the applications incorporated by reference; any alterations and further modifications of the described or illustrated embodiments, and any further applications of the principles of the disclosure as illustrated therein are contemplated as would normally occur to one skilled in the art to which the disclosure relates.

The foregoing description of the exemplary embodiments has been presented only for the purposes of illustration and description and is not intended to be exhaustive or to limit the devices and methods for using the same to the precise forms disclosed. Many modifications and variations are possible in light of the above teaching.

The embodiments were chosen and described in order to explain the principles of the devices and methods for using the same and their practical application so as to enable others skilled in the art to utilize the devices and methods for using the same and various embodiments and with various modifications as are suited to the particular use contemplated. Alternative embodiments will become apparent to those skilled in the art to which the present devices and methods for using the same pertain without departing from their spirit and scope. Accordingly, the scope of the present devices and methods for using the same is defined by the appended claims rather than the foregoing description and the exemplary embodiments described therein.

Clause 1. A system, comprising: a memory; and at least one computing device in communication with the memory, wherein the at least one computing device is configured to: responsive to receiving an input from a user: modify a current credit meter based on a bet amount; and generate an outcome of a wagering game; subsequent to generating the outcome, receive a request to perform a payout event of the current credit meter; determine a first payout amount based on a value of the current credit meter and preconfigured unit value for a first payment type; initiate a first payout of the first payment type of the first payout amount; and initiate a second payout of a second payment type of a remainder amount based on the value of the current credit meter less the first payout amount.

Clause 2. The system of clause 1 or any other clause herein, wherein initiating the second payout comprises printing a lottery ticket.

Clause 3. The system of clause 2 or any other clause herein, wherein the at least one computing device is further configured to calculate the remainder amount by rounding, to a unit value of the second payment type, the value of the current credit meter less the first payout amount.

Clause 4. The system of clause 2 or any other clause herein, wherein the at least one computing device is further configured to decrement a lottery ticket meter in response to printing the lottery ticket.

Clause 5. The system of clause 4 or any other clause herein, wherein the at least one computing device is further configured to print a report comprising a current value of the lottery ticket meter and an initial value of the lottery ticket meter.

Clause 6. The system of clause 2 or any other clause herein, wherein the at least one computing device is further configured to activate at least one of: the lottery ticket or a ticket batch comprising the lottery ticket.

Clause 7. The system of clause 2 or any other clause herein, wherein the at least one computing device is further configured to process the lottery ticket to determine a third payout amount.

Clause 8. The system of clause 7 or any other clause herein, wherein the at least one computing device is configured to: scan a portion of the lottery ticket to obtain an identifier; and determine the third payout amount based on the identifier.

Clause 9. The system of clause 8 or any other clause herein, wherein the at least one computing device is further configured to: transmit the identifier to a remote computing environment; and in response to transmitting the identifier, receive, from the remote computing environment, the third payout amount.

Clause 10. The system of clause 9 or any other clause herein, wherein the at least one computing device is further configured to initiate a third payout of the first payment type in the third payout amount.

Clause 11. A non-transitory computer-readable medium embodying a program that, when executed by at least one computing device, causes the at least one computing device to: receive a request to perform a payout event of a current credit meter; determine a first payout amount based on a value of the current credit meter and preconfigured unit value for a first payment type; initiate a first payout of the first payment type of the first payout amount; and initiate printing of at least one lottery ticket for a remainder amount based on the value of the current credit meter less the first payout amount.

Clause 12. The non-transitory computer-readable medium of clause 11 or any other clause herein, wherein the at least one lottery ticket is instant type.

Clause 13. The non-transitory computer-readable medium of clause 11 or any other clause herein, wherein the at least one lottery ticket is draw type.

Clause 14. The non-transitory computer-readable medium of clause 11 or any other clause herein, wherein the program that, when executed by at least one computing device, further causes the at least one computing device to: determine a second payout amount based on the at least one lottery ticket; and initiate a second payout of the first payment type of the second payout amount.

Clause 15. The non-transitory computer-readable medium of clause 11 or any other clause herein, wherein the program further causes the at least one computing device to initiate a wagering game in response to receiving an input comprising an identifier associated with the at least one lottery ticket subsequent to initiating the printing of the at least one lottery ticket.

Clause 16. A method, comprising: generating, via at least one computing device, a plurality of outcomes of a wagering game; receiving, via the at least one computing device, a request to perform a payout event of a current credit meter; determining, via the at least one computing device, a first payout amount based on a value of the current credit meter and preconfigured unit value for a first payment type; performing, via the at least one computing device, a first payout of the first payment type of the first payout amount; and performing, via the at least one computing device, a second payout of a second payment type of a remainder amount based on the value of the current credit meter less the first payout amount.

Clause 17. The method of clause 16 or any other clause herein, further comprising: determining a count of the plurality of outcomes generated during a session of the wagering game; and modifying, via the at least one computing device, the first payout based on the count of the plurality of outcomes generated during the session of the wagering game.

Clause 18. The method of clause 17 or any other clause herein, wherein modifying the first payout comprises: determining a payout limit by multiplying the count of the plurality of outcomes generated by a predetermined value; and modifying the first payout to not exceed the payout limit.

Clause 19. The method of clause 16 or any other clause herein, further comprising: determining, via the at least one computing device, a count of the plurality of outcomes generated during a session of the wagering game; and modifying, via the at least one computing device, the second payout based on the count of the plurality of outcomes generated during the session of the wagering game.

Clause 20. The method of clause 16 or any other clause herein, wherein the second payment type comprises a plurality of lottery prizes and the method further comprises: based on the remainder amount, determining at least one available lottery prize of the plurality of lottery prizes; and printing a lottery ticket corresponding to the at least one available lottery prize.

Therefore, at least the following is claimed:

1. A system, comprising:

a memory; and at least one computing device in communication with the memory, wherein the at least one computing device is configured to:

responsive to receiving an input to a user interface from a user:

modify a current credit meter based on a bet amount;

generate an outcome of a wagering game; and determine an accrued hand count based on the input;

subsequent to generating the outcome, receive a request, comprising an input to the user interface, to perform a payout event of the current credit meter;

determine a first payout amount based on a value of the current credit meter and preconfigured unit value for a first payment type;

initiate a first payout of the first payment type of the first payout amount, wherein the first payout amount comprises a predetermined multiple of the accrued hand count;

initiate a second payout of a second payment type of a remainder amount based on the value of the current credit meter less the first payout amount;

determine an identifier from a plurality of ticket identifiers;

transmit a request to a remote computing environment to activate a lottery ticket associated with the identifier; and in response to printing the lottery ticket, decrement a lottery ticket meter.

2. The system of claim 1, wherein initiating the second payout comprises printing the lottery ticket.

3. The system of claim 2, wherein the at least one computing device is further configured to calculate the remainder amount by rounding, to a unit value of the second payment type, the value of the current credit meter less the first payout amount.

4. The system of claim 2, wherein the at least one computing device is further configured to print a report comprising a current value of the lottery ticket meter and an initial value of the lottery ticket meter.

5. The system of claim 2, wherein the at least one computing device is further configured to activate at least one of: the lottery ticket or a ticket batch comprising the lottery ticket.

6. The system of claim 2, wherein the at least one computing device is further configured to process the lottery ticket to determine a third payout amount.

7. The system of claim 6, wherein the at least one computing device is configured to:

scan a portion of the lottery ticket to obtain the identifier; and determine the third payout amount based on the identifier.

8. The system of claim 7, wherein the at least one computing device is further configured to:

transmit the identifier to the remote computing environment; and in response to transmitting the identifier, receive, from the remote computing environment, the third payout amount.

9. The system of claim 8, wherein the at least one computing device is further configured to initiate a third payout of the first payment type in the third payout amount.

10. The system of claim 1, wherein the lottery ticket meter represents the plurality of ticket identifiers eligible for activation with the remote computing environment.

11. A non-transitory computer-readable medium embodying a program that, when executed by at least one computing device, causes the at least one computing device to:

receive a request, as an input to a user interface, to perform a payout event of a current credit meter;

determine a first payout amount based on a value of the current credit meter and preconfigured unit value for a first payment type;

initiate a first payout of the first payment type of the first payout amount, wherein the first payout amount comprises a predetermined multiple of an accrued hand count;

determine an identifier from a plurality of ticket identifiers;

transmit a request to a remote computing environment to activate at least one lottery ticket associated with the identifier;

initiate printing of the at least one lottery ticket for a remainder amount based on the value of the current credit meter less the first payout amount; and in response to printing the at least one lottery ticket, decrement a lottery ticket meter.

12. The non-transitory computer-readable medium of claim 11, wherein the at least one lottery ticket is instant type.

13. The non-transitory computer-readable medium of claim 11, wherein the at least one lottery ticket is draw type.

14. The non-transitory computer-readable medium of claim 11, wherein the program that, when executed by at least one computing device, further causes the at least one computing device to:

determine a second payout amount based on the at least one lottery ticket; and initiate a second payout of the first payment type of the second payout amount.

15. The non-transitory computer-readable medium of claim 11, wherein the program further causes the at least one computing device to initiate a wagering game in response to receiving an input comprising an identifier associated with the at least one lottery ticket subsequent to initiating the printing of the at least one lottery ticket.

16. A method, comprising:

generating, via at least one computing device, a plurality of outcomes of a wagering game;

receiving, via the at least one computing device, a request, as an input to a user interface, to perform a payout event of a current credit meter;

determining, via the at least one computing device, a first payout amount based on a value of the current credit meter and preconfigured unit value for a first payment type;

performing, via the at least one computing device, a first payout of the first payment type of the first payout amount, wherein the first payout amount comprises a predetermined multiple of an accrued hand count;

performing, via the at least one computing device, a second payout of a second payment type of a remainder amount based on the value of the current credit meter less the first payout amount;

determining, via the at least one computing device, an identifier from a plurality of ticket identifiers;

transmitting, via the at least one computing device, a request to a remote computing environment to activate a lottery ticket associated with the identifier; and in response to printing the lottery ticket, decrementing, via the at least one computing device, a lottery ticket meter.

17. The method of claim 16, further comprising:

determining a count of the plurality of outcomes generated during a session of the wagering game; and modifying, via the at least one computing device, the first payout based on the count of the plurality of outcomes generated during the session of the wagering game.

18. The method of claim 17, wherein modifying the first payout comprises:

determining a payout limit by multiplying the count of the plurality of outcomes generated by a predetermined value; and modifying the first payout to not exceed the payout limit.

19. The method of claim 16, further comprising:

determining, via the at least one computing device, a count of the plurality of outcomes generated during a session of the wagering game, wherein the accrued hand count comprises the count of the plurality of outcomes generated during the session of the wagering game; and modifying, via the at least one computing device, the second payout based on the count of the plurality of outcomes generated during the session of the wagering game.

20. The method of claim 16, wherein the second payment type comprises a plurality of lottery prizes and the method further comprises:

based on the remainder amount, determining at least one available lottery prize of the plurality of lottery prizes; and printing a lottery ticket corresponding to the at least one available lottery prize.

* * * * *